United States Patent [19]

Broadwater

[11] Patent Number: 5,305,621
[45] Date of Patent: Apr. 26, 1994

[54] COMPUTER DRIVE LOCKOUT DEVICE

[76] Inventor: Michael H. Broadwater, 105 SW Sixth, Rockaway Beach, Oreg. 97136

[21] Appl. No.: 995,717

[22] Filed: Dec. 23, 1992

[51] Int. Cl.⁵ .............................................. E05B 73/00
[52] U.S. Cl. ...................................... 70/14; 70/58; 70/161; 70/168; 360/137
[58] Field of Search ............... 70/14, 57, 58, 158–163, 70/166–169; 360/137

[56] References Cited

U.S. PATENT DOCUMENTS

| | | | |
|---|---|---|---|
| 2,543,214 | 2/1951 | Wildberg | 70/162 |
| 3,766,759 | 10/1973 | Artner | 70/230 X |
| 4,640,106 | 2/1987 | Derman | 70/14 |
| 4,685,312 | 8/1987 | Lakoski et al. | 70/14 |
| 4,794,587 | 12/1988 | Cordiano | 70/58 X |
| 4,856,304 | 8/1989 | Derman | 70/14 |
| 4,907,111 | 3/1990 | Derman | 360/97.04 X |
| 4,924,683 | 5/1990 | Derman | 70/14 |
| 4,964,285 | 10/1990 | Lakoski et al. | 70/14 |
| 5,117,661 | 6/1992 | Carl et al. | 70/14 |
| 5,136,862 | 8/1992 | Langen | 70/14 |

FOREIGN PATENT DOCUMENTS

WO90/01604  2/1990  PCT Int'l Appl. ............ 70/58

*Primary Examiner*—Lloyd A. Gall
*Attorney, Agent, or Firm*—Stephen S. Ford

[57] ABSTRACT

The invention is an interlocking lockout device for a computer system. The lockout device comprises a locking disk dimensioned similarly to a floppy disk for so that it can be inserted and locked into a disk-drive. An engagement member of the locking disk interlocks with a bezel. In a locked position, the bezel covers the disk-drive preventing the locking disk from being removed from the disk-drive and preventing foreign matter from being inserted into the computer and disk-drive. While inserted, the locking disk keeps the computer system from booting and thereby prevents unauthorized operation of the computer system. The bezel and locking disk are adaptable on any size disk-drive and can easily be installed on different systems. This provides a lockout capability for computer systems with multiple drives and variable sized disks.

20 Claims, 2 Drawing Sheets

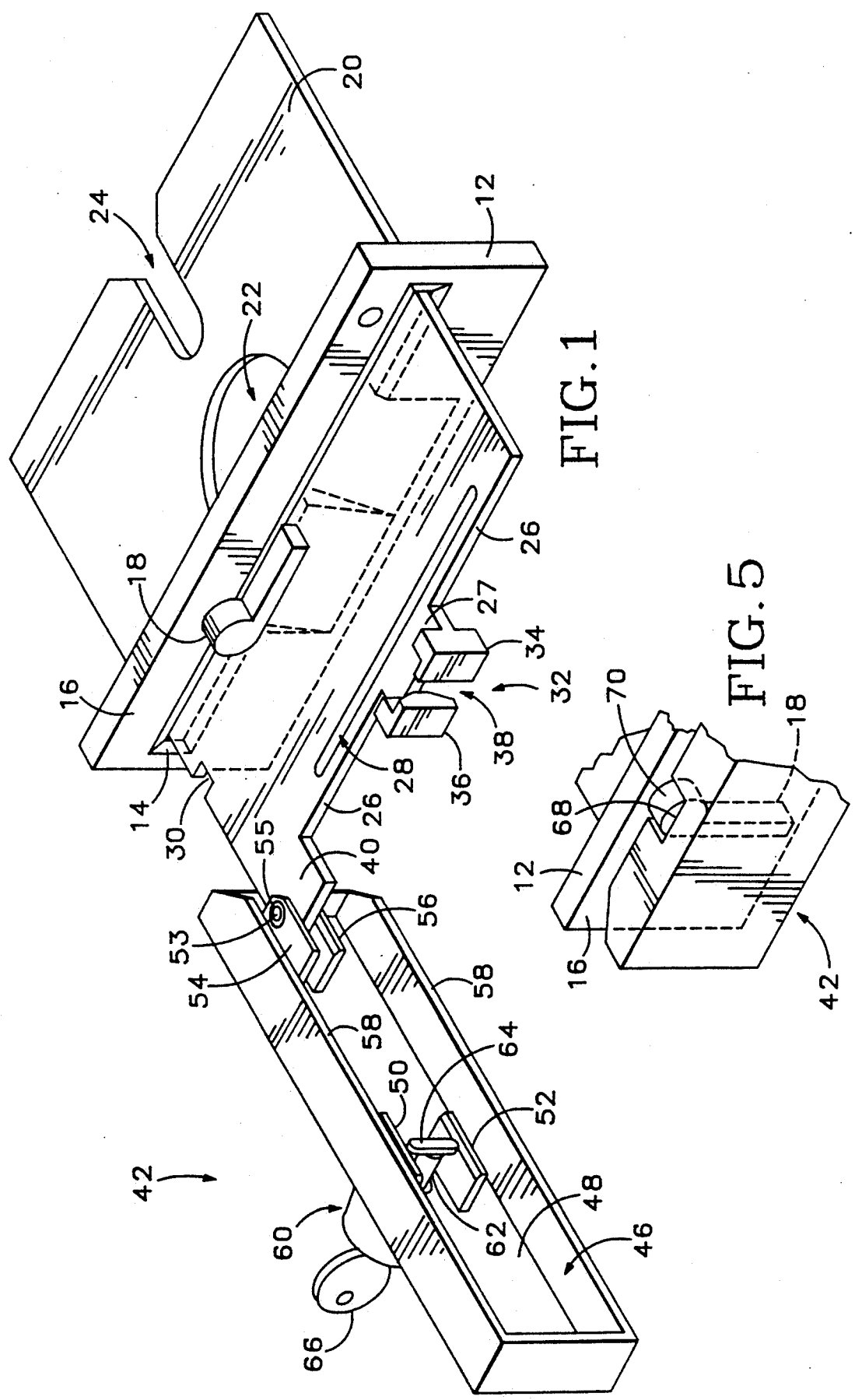

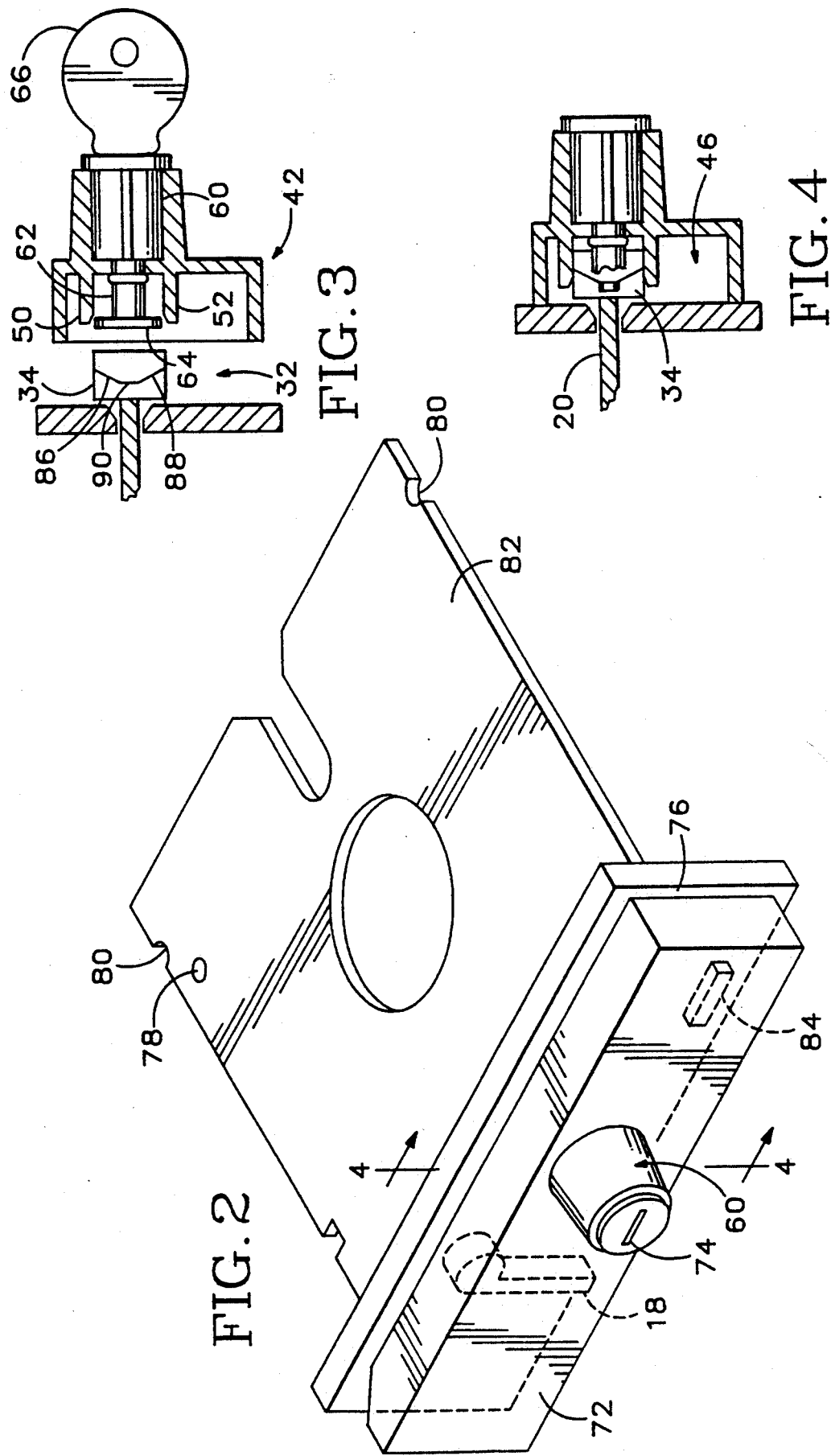

COMPUTER DRIVE LOCKOUT DEVICE

BACKGROUND OF THE INVENTION

This invention relates generally to a mechanism for locking a computer system and more particularly to a lockout device that inserts into and interlocks with a computer disk-drive to prohibit operation and access to the computer.

A typical computer system has an external input/output port (I/O port). The I/O port is used for transferring data between an external data storage medium (e.g., a floppy disk, CD RAM, CD ROM, optical disk, magnetic tape) and either an internal memory or an internal hard disk of the computer. For example, personal computers such as an IBM PC typically have a floppy disk-drive, a hard disk drive, and internal random access memory (RAM). Data is transferred from the floppy disk to RAM by simply directing the computer to read a file residing on the floppy disk. Data is transferred from the floppy disk to the hard disk (via RAM) with a simple copy command.

The disk-drive, while designed for convenient data transfer, also allows unauthorized access to the computer system. For example, copying data from a computer's hard drive simply requires turning on the computer, inserting a diskette into the floppy disk drive, and copying data from the computer hard disk to the diskette. Alternatively, if an unauthorized user wants to destroy files currently residing in the computer system, he or she simply has to turn on the computer and delete the file. Disk-drive lockout systems have been developed to prevent unauthorized access to a computer's data base. These lockout systems, however, are not completely effective in preventing access to the computer or preventing damage to the internal circuitry of the disk-drive and computer system. In U.S. Pat. No. 4,964,285 to Lakoski et. al., a locking device is used to block the floppy disk slot of a computer disk-drive. The locking device, while preventing insertion of a diskette into a floppy disk drive, does not effectively prohibit operation of the computer system.

For example, most computer systems require a start-up program (boot program) to begin normal operation. The start up program resides either on an external diskette or on an internal hard disk. An internal read only memory (ROM) in the computer directs the system to look first for the start up program on a floppy disk in the external disk-drive. If there is no disk in the external disk-drive, the ROM program directs the system to look for the start up routine on the internal hard disk drive. Therefore, even if the locking system in Lakoski is activated (i.e., the device is locked over the drive slot of the disk-drive) the system can still be operated by simply turning on the computer system. The data on the computer's hard disk could then be viewed and/or destroyed by an unauthorized user. In addition, the data on the computer hard disk could be extracted through an alternative data I/O port such as the computer's printer. The locking device in Lakoski, however, only covers a small portion of the disk-drive slot. Thus, a floppy disk locked in the computer's disk-drive, is still accessible. For example, the disk can be literally torn or jimmied out of the disk-drive allowing the computer to boot from the hard disk. In the alternative the disk could be mangled with a screwdriver destroying the data on the floppy disk. Since the disk-drive slot is not completely covered, potentially damaging foreign matter can also be injected into the disk-drive slot. For example, a young child could pour water into the slot, damaging the internal circuitry of the computer system and the disk-drive.

The effectiveness of a lockout system also depends upon how securely it is mounted on the computer system casing. For example, if the mounting screws of the lockout device are accessible, the lockout device can be disabled simply by unscrewing it from the computer. In addition, holes must be drilled into the metal casing of the computer system to mount the lockout device. Therefore, retrofitting the lockout device on existing computer systems is time consuming and expensive.

Lockout devices are usually permanently mounted on one specific computer system. Therefore, each additional computer must have its own separate locking device. However, some computer systems only need to be secured when certain confidential data is residing in memory. If the locking device were easily portable, it could "follow" the confidential data, and a single lockout device could effectively protect multiple systems.

Accordingly, a need remains for inexpensive portable computer lockout system that prevents both operation of the computer system and access to the internal circuitry of the disk-drive.

SUMMARY OF THE INVENTION

It is, therefore, an object of the invention to increase the effectiveness of a lockout device in preventing unauthorized operation of a computer system.

Another object of the invention is to increase the flexibility of a computer lockout device in securing different computer systems and to reduce the time and cost required for installation.

A further object of the invention is to simultaneously prevent unauthorized operation of the computer system and unauthorized access to the internal circuitry of the computer system and the disk-drive.

Accordingly, the invention includes an interlocking lockout device for a computer disk-drive. A typical disk-drive has a slot for receiving a floppy disk and has an internal locking mechanism for locking the disk inside the disk-drive. The lockout device comprises a locking disk dimensioned sufficiently similar to a floppy disk to allow insertion into the disk-drive slot. The locking disk is elongated to partially extend outside the disk-drive housing. The locking disk is also capable of being locked into the disk-drive by the internal locking mechanism. The portion of the locking disk extending outside the disk-drive housing is coupled to an engagement member.

The locking disk is coupled to a bezel. The bezel is sufficiently dimensioned to cover the front opening of the disk-drive slot and is also dimensioned to cover the disk-drive ejection device. An ejection device (e.g., button or crank) is used to unlock a floppy disk from the disk-drive so that the disk can be removed. The bezel also contains a lockable latch that is used for interlocking with the engagement member of the locking disk. This interlocks the bezel with the locking disk and prevents the disk from being removed.

The internal locking mechanism for each disk-drive can be different. For example, in a 5¼" disk-drive, a crank is typically used for locking the floppy disk inside the drive housing. In a 3½" disk-drive, however, a spring activated system is typically used. The spring activated system automatically locks a floppy disk into the drive when it is inserted sufficiently far enough into the drive slot. A push button is then used to deactivate the locking mechanism and eject the disk from the disk-drive. Another type of disk-drive unlocks disks by pushing horizontally forward on the disk itself. The disk-drives internal locking mechanism is then disengaged and a spring inside the disk-drive partially ejects the disk out of the disk-drive slot.

The bezel in the locked position covers the disk-drive ejection device. Therefore, the locking disk cannot be removed from the disk-drive without first removing the bezel. For a disk-drive locking mechanism that is deactivated by pressing forward on the disk, the bezel is sufficiently dimensioned to cover the drive slot. This prevents someone from pushing the locking disk forward to disengage it from the disk-drive. Since the bezel covers the disk-drive slot, foreign matter cannot be inserted into the computer or disk-drive.

The computer system is turned off before or after the locking disk is inserted into the disk-drive. Therefore, if the computer system is turned on while the lockout device is engaged, the computer system is unable to boot. This prevents unauthorized operation of the computer system. The locking disk is sized for insertion into any standard disk-drive and is completely portable. In addition, multiple lockout systems can be used at the same time. This provides protection for computer systems with multiple drives with variable sized disks.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 is a perspective view of a lockout device in an unlocked position according to the invention.

FIG. 2 is a perspective view of the lockout device of FIG. 1 in a locked position.

FIG. 3 is a detailed sectional view of a lock and engagement member of the lockout device illustrated in FIG.1 shown in an open position.

FIG. 4 is a detailed sectional view of the lock and engagement member of FIG. 4 shown in the locked position.

FIG. 5 is an alternative bezel configuration for the lockout device shown in FIG. 1.

DETAILED DESCRIPTION

FIG. 1 is a perspective view of an interlocking lockout device for a computer disk-drive. A disk-drive (not shown) resides within a cabinet of a personal computer (not shown). The computer includes a disk-drive housing 12 with a slot 14 that faces forward away from the computer system. A crank 18 is attached pivotally to an outer face 16 of the disk-drive housing 12. A locking disk 20 sized for a 5¼" disk-drive, is dimensioned for insertion lengthwise into the slot 14 and has a forward facing front edge 26. The locking disk has a tab portion 40 and an engagement portion 27 which both extend from the front edge 26. A mounting hole 22, a disk-drive head access slot 24, and a slot 28 extend through the locking disk 20. The engagement portion 27 is attached to an engagement member 32. The engagement member 32 comrprises two inwardly facing engagement arms 36 and 34 that are separated by a channel 38.

A bezel 42 comprises an inner cavity 46 with a rear face 58. A first set of flanges 54 and 56 and a second set of flanges 50 and 52 extend out of an internal cavity face 48. Flanges 54 and 56 have coaxial holes 55 that align with a similar hole (not shown) in tab portion 40. Tab portion 40 is inserted between flanges 54 and 56 so that the tab hole is coaxially aligned with the flange holes 55. A pin 53 is force fit through the flange and tab holes to pivotally couple the bezel 42 to the locking disk 20. A lock 60 is attached to the bezel 42 and comprises a lever 64 coupled to the lock by a rotatable cylinder 62. A key 66 is insertable into lock 60.

FIG. 2 shows the lockout device of FIG. 1 shown in a locked position. The locking disk 82 and bezel 72, however, are shown sized for a 3½" floppy disk-drive. The 3½" disk-drive (not shown) typically has a button 84 that is used for disengaging the floppy disk from the disk-drive. The crank 18 from FIG. 1 is also shown in dashed lines to illustrate how the bezel covers either ejection mechanism (i.e., crank 18 or button 84). Lock 60 and engagement member 32 (not shown) are the same as those illustrated in FIG. 1.

FIG. 3 is a detailed section view of the lock 60 and the engagement member 32 illustrated in FIG. 1. The lock 60 contains a key slot 74 (see FIG. 2) for receiving the key 66 and is coupled by the key cylinder 62 to the lever 64. The lever is shown in a vertically aligned unlocked position 64 in both FIGS. 1 and 3. Engagement arm 34 (see also FIG. 1) contains a top inclined face 86 coupled to a bottom inclined face 88 by a connecting face 90. FIG. 4 shows the sectional view of FIG. 3 with the bezel in a locked position.

Referring back to FIG. 1, before engaging the lockout system, the computer is shut off and any disk presently residing within the disk-drive is removed. The locking disk 20 is fully inserted through slot 14 into the disk-drive. In the fully inserted position, front edge 26 of the locking disk 20 is slightly recessed within the disk housing 12. Tab portion 40 and engagement portion 27 extend forward out of the disk housing. The locking disk 20 is locked into the disk-drive by rotating crank 18 clockwise in front of edge 26. Thus, removal of the locking disk from the disk-drive is prevented by crank 18. For the 3½" disk-drive illustrated in FIG. 2, the locking disk 82 is inserted into the disk-drive slot. An internal disk-drive locking mechanism then automatically locks locking disk 82 into the drive.

After the locking disk is locked inside the disk-drive, the bezel 42 is rotated about the axis of pin 53. The bezel is rotated until it reaches a locking position where edge 58 comes in contact with the front surface 16 of drive housing 12. In the locking position, bezel 42 covers the slot 14 and crank 18 (see FIG. 2). As the bezel is placed into the locking position, lever 64 of lock 60 is in a vertical unlocked position. This allows the lever to pass through channel 38 of engagement member 32. After passing through channel 38, the lever 64 is rotated by inserting the key 66 into slot 74 (see FIG. 2) and rotating the lock cylinder 62.

Referring to FIGS. 3 and 4, while in the locking position, lever 64 begins to rotate, traversing up inclined face 86. This pulls the engagement member 32 toward bezel 42 in between flanges 50 and 52. Slot 28 (see FIG. 1) allows locking disk 20 to operate in a manner similar to a spring by allowing additional forward movement of the engagement member 32 into the bezel cavity. As lever 64 pulls the engagement member 32 forward, the disk-drives internal locking mechanism holds the locking disk 20 in place. Thus, when lever 64 moves onto surface 90 in the locked position, the engagement member 32 is urged toward the forward direction slightly separating locking disk 20 on opposite sides of slot 28. The locking disk has a tendency to revert back into its relaxed state (e.g., engagement member 32 in the position as illustrated in FIG. 1). The locking disk, therefore, pulls the extended engagement member 32 back into the relaxed position, holding the rear face 58 of bezel 42 firmly against the front face 16 of the disk-drive housing 12.

The bezel cavity 46 is sufficiently deep to encompass both the protruding portions of the locking disk 20, the engagement member 32, and crank 18. Since the engagement member 32 is securely inserted between flanges 50 and 52, the bezel cannot be rotated or lifted up or down. In the locking position, the tab portion 40 is fully inserted between tabs 54 and 56 (see FIG. 1). This increases the overall cohesive bond between the locking disk 20 and bezel 42. Thus, the bezel flanges prevent someone from jimmying the bezel in an attempt to disengage lever 64 from engagement member 32.

As explained above, when the computer operating system is turned on, it first attempts to read data from any external disk-drive that contains a disk. This is done before attempting to boot off any internal hard disk. While locking disk 20 is locked into the disk-drive, the computer system thinks a floppy disk resides in its disk-drive. Therefore, the computer tries to read the locking disk. Because the locking disk cannot be read, the computer operating system acknowledges a reading error condition, and discontinues any further part of the boot routine.

The locking disk holes 22 and 24 are positioned to prevent any part of the disk-drive recording/playback head and the disk spindle from contacting the locking disk. This prevents the disk-drive from being damaged when the computer system is turned on while the lockout device is engaged. Any additional slots or holes required by a particular disk-drive locking mechanism are incorporated into the locking disk. For example, notch 30 in the 5¼" locking disk 20 of FIG. 1 and notches 80 and hole 78 in the 3½" locking disk in FIG. 2. The locking disk is made out of a rigid glass-filled nylon material approximately 0.07" thick. This makes the locking disk resistant to tearing if excessive force is applied to the bezel in an attempt to dislodge the lockout device.

To disengage the lockout system, the key is inserted into the key slot 74 and rotated 90 degrees back to its unlocked position. The lever 64 is repositioned back to a vertical position disengaging arms 34 and 36. This allows the bezel 42 to be rotated about the axis of pin 53 away from disk-drive housing 12. The locking disk is then free to be disengaged from the disk-drive locking mechanism. This is performed by rotating crank 18 counter-clockwise into a horizontal unlocked position. To remove the 3½" locking disk as illustrated in FIG. 2, the bezel is first unlocked as described above. Button 84 is then depressed and a spring, internal to the disk-drive, partially ejects locking disk 82.

FIG. 5 illustrates an alternative bezel configuration. The bezel 42 has a notch 68 of sufficient size for a section 70 of crank 18 to protrude out of the top face of the bezel. This allows the height of the bezel to be equal or less than the height of the front face 16 of disk-drive housing 12. This allows a single bezel size to attach to any type of computer housing. The size of hole 68 can be adjusted for a secure fit around different crank sizes or for different crank positions.

FIGS. 1 and 2 show a disk-drive housing which resides within the cabinet of the computer system. The lockout device works equally well with a disk-drive that resides within a separate enclosure. For example, a disk-drive that communicates to the computer system via an external cable. The system also works in disk-drives with spring activated locking mechanisms. For example, in some disk-drives, a section of the floppy disk protrudes out of the disk-drive housing while locked inside the drive. The disk is disengaged from the disk-drive by pressing forward on the disk. This activates a spring inside the disk-drive that disengages and partially ejects the disk from the disk-drive slot. In the locked position, the bezel prevents the locking disk from being pushed forward into the disk-drive keeping the locking disk from being disengaged. Thus, the lockout device works equally well with the above mentioned disk-drive.

In an alternative embodiment of the present invention, the lockout device is used with a tape drive. With typical tape drives, such as the TECMAR model 060H, a magnetic tape is inserted into a tape drive. The tape is then used to transfer data between the tape and the computer system. The tape after being inserted into the tape drive is automatically locked by the drives internal locking mechanism in a manner similar to that described above. The tape is then removed from the drive by pushing the tape slightly forward into the drive. This activates a spring inside the drive that disengages the locking mechanism and partially ejects the tape. The lockout device in this system comprises a locking block dimensioned in the shape of a tape. The block has an engagement member similar to engagement member 32 as illustrated in FIG. 1. The engagement member is locked to a bezel that prevents the locking block from being extracted from the tape drive.

The lockout system illustrated above is easily adaptable to various other types of data storage systems. For example, the lockout system can be used in CD ROMs, CD RAMs and optical disk-drives. In addition, multiple lockout devices can be used in a computer system with multiple disk-drives. A separate lockout system is inserted into each disk-drive and interlocked as described above. Thus, a computer system using multiple size disk-drives or any combination of disk and tape drives can be effectively locked with the present invention. Since the device is easily installed, it can also be transferred between more than one computer system. Therefore, a separate lockout device does not have be bought or attached to one specific computer system.

Having described and illustrated the principles of the invention in a preferred embodiment thereof, it should be apparent that the invention can be modified in arrangement and detail without departing from such principles.

I claim all modifications and variation coming within the spirit and scope of the following claims:

1. A method for locking an external drive of a computer system with a lockout device of the type having a locking unit insertable into the external drive, the external drive defined by a slot dimensioned to receive a data storage device and a bezel that can be interlocked with an engagement member coupled to the locking unit, said method comprising;

turning off the computer system;
   pivotally interlocking the bezel to a first location on the locking unit;

disabling the computer system by inserting and locking the locking unit into the external drive slot while the locking unit is pivotally interlocked to the bezel;

rotating the bezel about the locking unit until the bezel both abuts a front face of the external drive and engages with the engagement member to prevent access to the external drive; and locking the bezel to the locking unit to prevent the lockout device from being removed from the external drive.

2. A method according to claim 1 wherein the bezel is rotated about the locking unit in a horizontal plane.

3. A method according to claim 1 wherein locking the bezel to the locking unit rotates the bezel further about the locking unit at the first location pulling the bezel tighter against the front face of the drive.

4. A lockout device for preventing unauthorized access to a computer system of the type having a drive housing with a slot for receiving and locking an external storage medium in the drive housing, and an ejection mechanism for disengaging the external storage medium from the slot, said lockout device comprising:

a locking disk dimensioned sufficiently similar to the external storage medium to allow insertion and locking into the slot of the drive housing;

a bezel having a vertically aligned front wall joined at a top and bottom end by a pair of horizontally aligned top and bottom walls and joined at opposite lateral ends by a pair of vertically aligned end walls forming a cavity dimensioned to cover the slot in the drive housing and the ejection mechanism;

a lock having a first member coupled to the locking disk and a second member coupled to the bezel lockable to the first member for interlocking the bezel to the locking disk;

means for pivotally coupling the bezel to the locking disk at a first location spaced from the lock so that the first and second lock members can be separated and the locking disk inserted and locked in the slot while the bezel and locking disk remain pivotally coupled together;

the bezel being rotatable about the inserted and locked locking disk at the first location abutting against the drive housing thereby allowing the first lock member to move into an engagement position with the second lock member, the first and second lock members being lockable together in the engagement position further urging the bezel toward the drive housing for preventing disengagement of the locking disk from the drive housing and access to the slot in the drive housing.

5. A lockout device according to claim 4 wherein the drive housing contains a disk-drive for receiving a diskette through the slot.

6. A lockout device according to claim 5 wherein the locking disk is substantially dimensioned in the shape of a diskette.

7. A lockout device according to claim 4 wherein the second lock member comprises a key activated rotatable shaft coupled to a latch that interlocks into the first lock member.

8. A lockout device according to claim 4 wherein the ejection mechanism comprises a lever attached to the outside of the drive housing.

9. A lockout device according to claim 4 wherein the ejection mechanism comprises a button attached to the outside of the drive housing.

10. A lockout device according to claim 4 wherein the bezel is pivotally coupled to a tab portion attached to the locking disk that extends out of the drive slot while the locking disk is locked in the drive housing.

11. A lockout device according to claim 10 including a flange extending out of the bezel pivotally coupled with the tab portion to prevent the bezel from being removed form the locking disk.

12. A lockout device according to claim 10 wherein locking the first and second lock members together while the locking disk is locked in the slot causes the bezel to pivot about the tab portion pulling the bezel securely against the drive housing.

13. A security system for disabling a computer of the type having a drive with an internal cavity dimensioned to receive a data storage device, and a locking mechanism for locking the data storage device in the drive, said security system comprising;

a locking device dimensioned for horizontal insertion and locking into the drive cavity having first and second engagement members each horizontally spaced apart and extending out of the drive cavity after the locking device is locked inside the drive with the locking mechanism;

a bezel having a vertically aligned front wall joined at a top and bottom end by a pair of horizontally aligned top and bottom walls and joined at opposite lateral ends by a pair of vertically aligned end walls forming a cavity, the bezel hinged to the first engagement member of the locking device allowing the bezel to pivot about the first engagement member for abutment against the drive and for covering the internal cavity; and a lock attached to the bezel that swings about the first engagement member to engage with the second engagement member in a locked position for interlocking the bezel to the locking device, the bezel in the locked position being locked to the locking device with the lock at the second engagement member maintaining a non-pivoting condition thereby preventing access to the drive cavity and disengagement of the locking device from the drive.

14. The security system according to claim 13 wherein the drive is a 5¼" floppy disk-drive.

15. The security system according to claim 13 wherein the drive is a 3½" floppy disk-drive.

16. The security system according to claim 13 wherein the locking device while locked in the drive cavity prevents the computer from booting.

17. The security system according to claim 13 wherein the first engagement member comprises a tab with a hole, the tab extending out of the drive while the locking device is locked in the drive.

18. The security system according to claim 13 including a pair of flanges extending from the front wall of the bezel into the bezel cavity positioned above and below the second engagement member when the bezel is interlocked with the locking device.

19. The security system according to claim 13 including a top and bottom flange joined to the bezel and positioned above and below the first engagement member, respectively, the top and bottom flange each pivotally coupled to the first engagement member.

20. A security system for disabling a computer of the type having a drive with an internal cavity dimensioned to receive a data storage device, and a locking mechanism for locking the data storage device in the drive, said security system comprising;
- a locking device dimensioned for insertion into the drive cavity having first and second engagement members, the locking device lockable inside the drive with the locking mechanism;
- a bezel pivotally coupled to the first engagement member of the locking device;
- a lock attached to the bezel that engages the second engagement member in a locked position for interlocking the bezel to the locking device, the bezel in the locked position preventing access to the drive cavity and disengagement of the locking device from the drive;
- the first engagement member having a tab with a hole, the tab extending out of the drive while the locking device is locked in the drive;
- a first and second flange coupled to the bezel, the flanges having coaxially aligned holes; and
- a pin sized for insertion into the tab hole and the flange holes;
- the flanges positioned above and below the tab, respectively, and the flange holes coaxially aligned with the tab hole so that inserting the pin into the holes pivotally couples the bezel to the locking device.

* * * * *